United States Patent
Fischer

(10) Patent No.: US 9,829,094 B2
(45) Date of Patent: Nov. 28, 2017

(54) APPARATUS FOR CONTROLLING AN AUTOMATICALLY SHIFTING TRANSMISSION

(71) Applicant: Bayerische Motoren Werke Aktiengesellschaft, Munich (DE)

(72) Inventor: Norbert Fischer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 114 days.

(21) Appl. No.: 14/747,284

(22) Filed: Jun. 23, 2015

(65) Prior Publication Data
US 2015/0377347 A1    Dec. 31, 2015

(30) Foreign Application Priority Data
Jun. 25, 2014    (DE) .................. 10 2014 212 244

(51) Int. Cl.
F16H 59/08 (2006.01)
F16H 61/02 (2006.01)
F16H 59/52 (2006.01)
F16H 59/66 (2006.01)

(52) U.S. Cl.
CPC ......... *F16H 61/0248* (2013.01); *F16H 59/52* (2013.01); *F16H 61/0213* (2013.01); *F16H 2059/663* (2013.01); *F16H 2061/0227* (2013.01)

(58) Field of Classification Search
CPC ........... F16H 59/0204; F16H 2059/082; F16H 2059/663; F16H 61/0213; F16H 61/0248; F16H 2061/663; F16H 59/08; F16H 61/02
See application file for complete search history.

(56) References Cited

U.S. PATENT DOCUMENTS

| 5,868,033 A | 2/1999 | Nishino et al. |
| 2011/0077119 A1* | 3/2011 | Kamm .................. F16H 3/666 475/296 |
| 2014/0149008 A1* | 5/2014 | Shibata .................. F16H 63/42 701/58 |
| 2015/0377345 A1* | 12/2015 | Fischer .................. F16H 61/16 701/62 |

FOREIGN PATENT DOCUMENTS

| DE | 197 09 506 A1 | 11/1997 |
| DE | 10 2007 006 210 A1 | 8/2008 |
| DE | 10 2007 023 267 A1 | 11/2008 |
| DE | 10 2008 061 957 A1 | 9/2009 |
| DE | 10 2013 011 559 A1 | 6/2014 |

OTHER PUBLICATIONS

German Search Report dated Mar. 16, 2015 with partial English-language translation (eleven (11) pages).

* cited by examiner

*Primary Examiner* — Huan Le
(74) *Attorney, Agent, or Firm* — Crowell & Moring LLP

(57) ABSTRACT

In the active transportation mode of a motor vehicle, only the forward gears can be selected. The weakest shift element, in particular the weakest brake or clutch in an automatic transmission, always is closed in the forward gears. Preferably, manual shifting options in an electronically controlled automatic transmission with a manual mode are additionally suppressed.

8 Claims, 2 Drawing Sheets

| Gear | Brake | | Clutch | | | Transmission ratio i |
|---|---|---|---|---|---|---|
| | A | B | C | D | E | |
| G1 | x | x | x | | | 4.714 |
| G2 | x | x | | | | 3.143 |
| G3 | x | x | | | x | 2.106 |
| G4 | x | x | | x | x | 1.667 |
| G5 | | x | x | x | | 1.285 |
| G6 | | | x | x | x | 1.000 |
| G7 | x | | x | x | | 0.839 |
| G8 | x | | | x | x | 0.667 |
| GR | x | x | | x | | 3.317 |

APPARATUS FOR CONTROLLING AN AUTOMATICALLY SHIFTING TRANSMISSION

CROSS REFERENCE TO RELATED APPLICATION

This application claims priority under 35 U.S.C. §119 from German Patent Application No. 10 2014 212 244.9, filed Jun. 25, 2014, the entire disclosure of which is herein expressly incorporated by reference.

This application contains subject matter related to U.S. application Ser. No. 14/747,314, entitled "Apparatus for Controlling an Automatically Shifting Transmission" filed on Jun. 23, 2015.

BACKGROUND AND SUMMARY OF THE INVENTION

The invention relates to an apparatus for controlling an automatically shifting transmission having at least one selector device by way of which at least the driving stages P, R, N, D, which can be set in an automatic mode, can be defined.

An apparatus of this kind is known, for example, from DE 10 2007 023 267 A1. This known apparatus has a first selector device in the form of a selector lever in an automatic gate, with which selector lever at least the driving stages P, R, N, D which can be set in an automatic mode can be defined. An automatic gear selection can be carried out, in particular, in the driving stage D. A second selector device is used to manually shift up or shift down the gears of the transmission in steps in a manual mode. The second selector device can be provided, for example, in the form of two switches, which are integrated in the steering wheel or in the form of two switches which are integrated in a manual gate of the selector lever. The known apparatus has at least one electronic transmission control device, which is customary in automatic transmissions or automated manual transmissions.

Furthermore, it is known to change the motor vehicle into a so-called transportation mode after the production process of the motor vehicle, for example by way of a diagnostic tester or automatically when certain operating conditions are present (DE 10 2008 061 957 A1). In this case, according to the prior art, corresponding pre-specification of a maximum permissible engine rotational speed in an electronic engine control unit for example prevents the engine of the motor vehicle from being overrevved when loading the motor vehicle or when maneuvering the motor vehicle before or after transportation. Such overrevving disadvantageously subjects component to loading.

The object of the invention is to also provide protection for automatic transmissions or automated transmissions in the transportation mode.

According to the invention, this and other objects are achieved by a motor vehicle comprising an apparatus for controlling an automatically shifting transmission having at least one selector device by way of which at least the driving stages P, R, N, D, which can be set in an automatic mode, can be defined. The motor vehicle further comprises an electronic transmission control unit by way of which shift elements of the transmission for selecting a respectively prespecified gear can be actuated depending on signals from the selector device and further input signals. The control unit also receives, as an input signal, the state of a transportation mode. A transportation mode functional module is provided by which only the forward gears can be selected in the active transportation mode. The weakest shift element (in this case the clutch) of the transmission always is closed in the forward gears.

Using the apparatus according to the invention, in particular by appropriate programming of the/an electronic transmission control unit in the active transportation mode of a motor vehicle, only the forward gears can be selected, the weakest shift element, in particular the weakest brake or clutch in an automatic transmission, always being closed in the forward gears.

Preferably, manual shifting options in an electronically controlled automatic transmission with a manual mode are additionally suppressed.

The invention advantageously minimizes or eliminates the repeated occurrence of destroyed clutches in automatic transmissions due to excessively high shift loadings in motor vehicle loading processes during transportation.

Other objects, advantages and novel features of the present invention will become apparent from the following detailed description of one or more preferred embodiments when considered in conjunction with the accompanying drawings.

DETAILED DESCRIPTION OF THE DRAWINGS

Figures 1, 2:
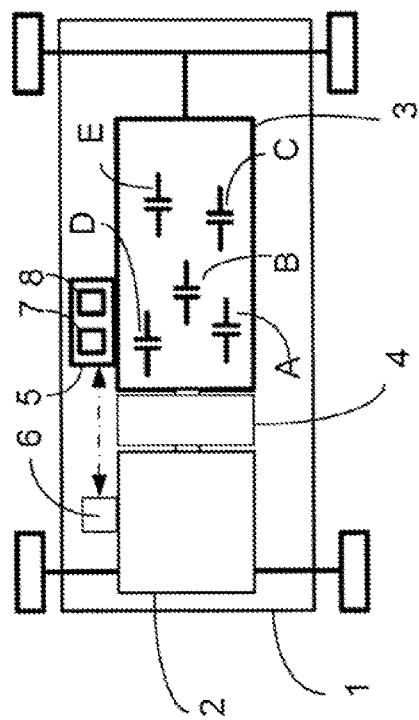
FIG. 1 is a schematic diagram of an entire drive train of a motor vehicle having a transportation mode functional module according to an embodiment of the invention.
FIG. 2 is a shifting diagram for the transmission controller for use in conjunction with the transportation mode controller according to an embodiment of the invention.

FIG. 1 schematically shows a motor vehicle 1 which has a drive motor 2, an automatic transmission 3 and, for example, a converter clutch as coupling unit 4 between drive motor 2 (in particular, an internal combustion engine) and automatic transmission 3. An electronic motor control unit 6 is associated with the drive motor 2, and an electronic transmission control unit 5 is associated with the automatic transmission 3. The two control units 5 and 6 communicate with one another, for example, by means of a CAN data bus and, in this way, exchange information and commands.

The automatic transmission 3 which interacts with the drive motor 2 by way of the coupling unit 4 includes shift elements A, B, C, D and E between its input shaft and its output shaft in order to select the gears G1 to G8 and GR (reverse gear) which can be actuated by the electronic transmission control unit 5. In this case, the shift elements A and B are, for example, transmission brakes, and the shift elements C, D and E are transmission clutches. The electronic control unit 5 contains a program module 7 as the transportation mode functional module for carrying out the method according to the invention.

FIG. 2 shows a table 8, which is likewise stored in the transmission control unit 5, for an exemplary automatic transmission 3. The table 8 shows the gears in which the shift elements A, B, C, D and E are closed (=X). The invention makes use of the fact that the same shift elements are required for several gears. In this respect, the shift element E is particularly relevant for the gears G2, G3 and G4 in the illustrated exemplary embodiment.

Figure 3:
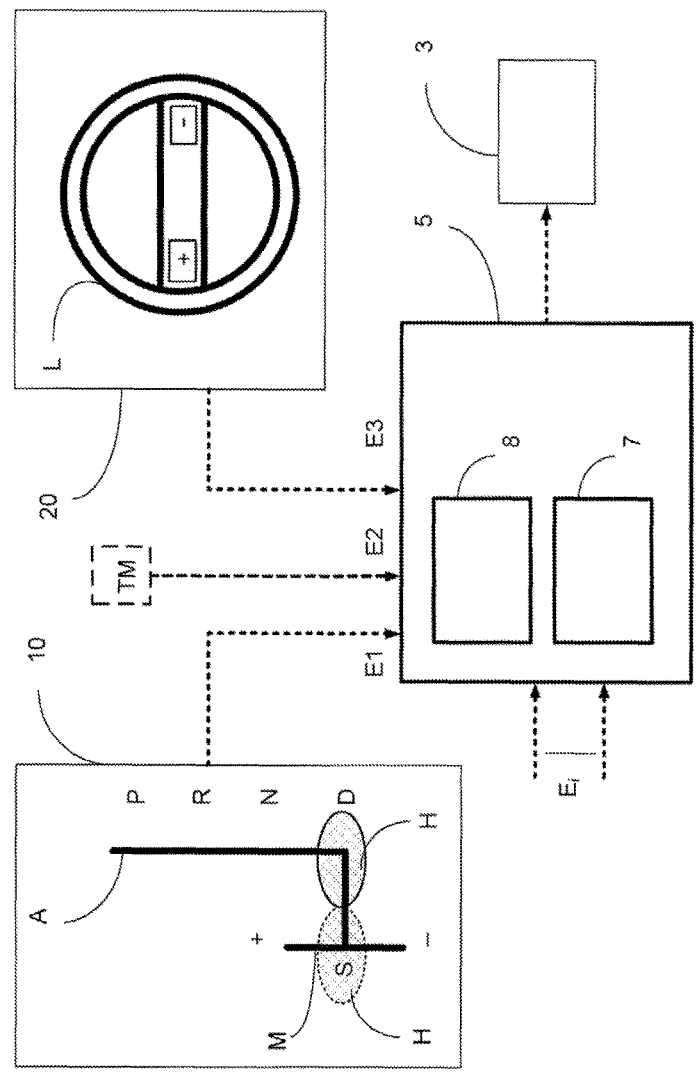
FIG. 3 is a schematic overview diagram of the transmission-related components which are relevant to an embodiment of the invention.

FIG. 3 shows a detailed apparatus for controlling the automatic transmission 3 including a first selector device 10 in the form of an automatic gate for a selector lever H which, in this A gate (first gate), can be moved in order to define the driving stages P, R, N and D which can be set in an automatic mode A. Also shown is a second selector device 20 or 10 in the M gate which may be in the form of an upshift button (+button) and a downshift button (−button) either in the steering wheel L or in a manual gate (second gate, M gate) for operation by means of the selector lever H. In a manual mode M, the gears of the transmission 3 can be manually shifted up or shifted down in steps by the upshift button (+) and downshift button (−). In this case, it is possible to temporarily leave the automatic mode A.

FIG. 3 further shows the electronic transmission control unit 5 in more detail. The electronic transmission control unit 5 receives various input signals $E_i$, including the signals E1 and E3 from the selector devices 10 and 20. The shift elements A, B, C, D and E of the automatic transmission 3 for selecting a respectively prespecified gear G1 to G8 and GR are actuated by way of the programmed switching logic in accordance with table 8 depending on the input signals.

According to an embodiment of the invention, the control unit 5 also receives, as input signal E2, the state of a transportation mode TM. The control unit 5 includes the transportation mode functional module 7 already mentioned above. Only the forward gears—G2, G3 and G4 in this case—can be selected by this module 7, which may be a software program module in particular, in the active transportation mode TM. The weakest shift element of the transmission 3—the clutch E in this case—always is closed in the forward gears.

In an advantageous development of the invention, the control unit 5 does not permit direct upshift or downshift operations by the transportation mode functional module 7 in the active transportation mode TM when the second selector device 20 or 10 is operated in the M gate. Therefore, the manual mode M is blocked in the activated transportation mode TM.

A sport mode S is preferably also blocked in the activated transportation mode TM, it being possible in principle for the sport mode to be activated by appropriate operation of the operator control element. In the illustrated exemplary embodiment, the sport mode S can be activated by the selector lever H being moved from the A gate to the M gate.

In a further improvement to the invention, the transportation mode functional module 7 can, as an exception, then permit a lower gear—for example the 1st gear G1 in this case—when the longitudinal inclination of the motor vehicle exceeds a specific threshold value. This can take place, for example, when driving up a comparatively steep upper level of a transporter.

The invention prevents wear-increasing incorrect operator control operations during transportation and loading of newly produced motor vehicles. However, sufficient power availability and drivability are also ensured at the same time.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle equipped with an automatically shifting transmission, the motor vehicle comprising:
at least one selector device defining at least driving stages P, R, N, and D, which are settable in an automatic mode;
an electronic transmission control unit by which shift elements of the automatically shifting transmission for selecting a respectively defined gear are actuatable depending on signals from the selector device, wherein
the electronic transmission control unit comprises a transportation mode functional module,
the electronic transmission control unit receives an input signal indicative of a state of a transportation mode,
the transportation mode functional module of the control unit is configured to only allow selection of forward gears when the signal indicates the motor vehicle is in the transportation mode,
each shift element has a different torque rating and a shift element having a weakest torque rating of the automatically shifting transmission is always closed in the forward gears,
the electronic transmission control unit determines whether the motor vehicle has a longitudinal inclination exceeding a defined threshold value, and
if the motor vehicle has the longitudinal inclination exceeding the defined threshold value, the electronic transmission control unit controls the automatically shifting transmission to permit a gear that is lower than the allowed forward gears in the transportation mode to be selectable.

2. The motor vehicle according to claim 1, further comprising:
a second selector device by which a direct upshift operation and/or downshift operation are triggerable, wherein
signals from the second selector device are also input to the electronic transmission control unit, and
the transportation mode functional module of the electronic transmission control unit is configured to not permit the directed upshift or downshift operation in the transportation mode when the second selector device is operated.

3. The motor vehicle according to claim 1, wherein the motor vehicle comprises a sport mode of operation, the transportation mode functional module being configured to prevent activation of the sport mode when in the transportation mode.

4. The motor vehicle according to claim 1, wherein forward gears are limited to second, third, and fourth gears.

5. A method of controlling an automatically shifting transmission of a motor vehicle equipped with a first selector device by which driving stages P, R, N, and D are settable in an automatic mode, and an electronic transmission control unit by which shift elements of the automatically shifting transmission for selecting a respectively predefined gear are actuatable depending on signals from the selector device, the method comprising the acts of:
receiving, by the electronic transmission control unit, a signal indicative of whether the motor vehicle is in a transportation mode or not;
receiving, by the electronic transmission control unit, a signal of a second selector device by which a direct upshift and/or downshift operation is triggerable;
if the signal indicates the motor vehicle is in the transportation mode, controlling the automatically shifting transmission such that only a limited number of forward gears out of an available number of gears are selectable, wherein each shift element has a different torque rating and a shift element having a weakest torque rating of the automatically shifting transmission is controlled to always be closed in the limited number of forward gears, and if the motor vehicle is in the transportation mode, controlling the automatically shifting transmission to not permit the direct upshift and/or downshift operation.

6. The method according to claim 5, further comprising the acts of:

if the motor vehicle is in the transportation mode, controlling the automatically shifting transmission to prevent activation of a sport mode of the motor vehicle otherwise available for selection.

7. The method according to claim 5, further comprising the acts of:

determining whether the motor vehicle has a longitudinal inclination exceeding a defined threshold value; and if the motor vehicle has the longitudinal inclination exceeding the defined threshold value, controlling the automatically shifting transmission to permit a gear that is lower than the limited number of forward gears predefined in the transportation mode to be selectable.

8. A method of controlling an automatically shifting transmission of a motor vehicle equipped with a first selector device by which driving stages P, R, N, and D are settable in an automatic mode, and an electronic transmission control unit by which shift elements of the automatically shifting transmission for selecting a respectively predefined gear are actuatable depending on signals from the selector device, the method comprising the acts of:

receiving, by the electronic transmission control unit, a signal indicative of whether the motor vehicle is in a transportation mode or not;

if the signal indicates the motor vehicle is in the transportation mode, controlling the automatically shifting transmission such that only a limited number of forward gears out of an available number of gears are selectable, wherein each shift element has a different torque rating and a shift element having a weakest torque rating of the automatically shifting transmission is controlled to always be closed in the limited number of forward gears;

determining whether the motor vehicle has a longitudinal inclination exceeding a defined threshold value; and if the motor vehicle has the longitudinal inclination exceeding the defined threshold value, controlling the automatically shifting transmission to permit a gear that is lower than the limited number of forward gears predefined in the transportation mode to be selectable.

* * * * *